United States Patent Office 3,097,667
Patented July 16, 1963

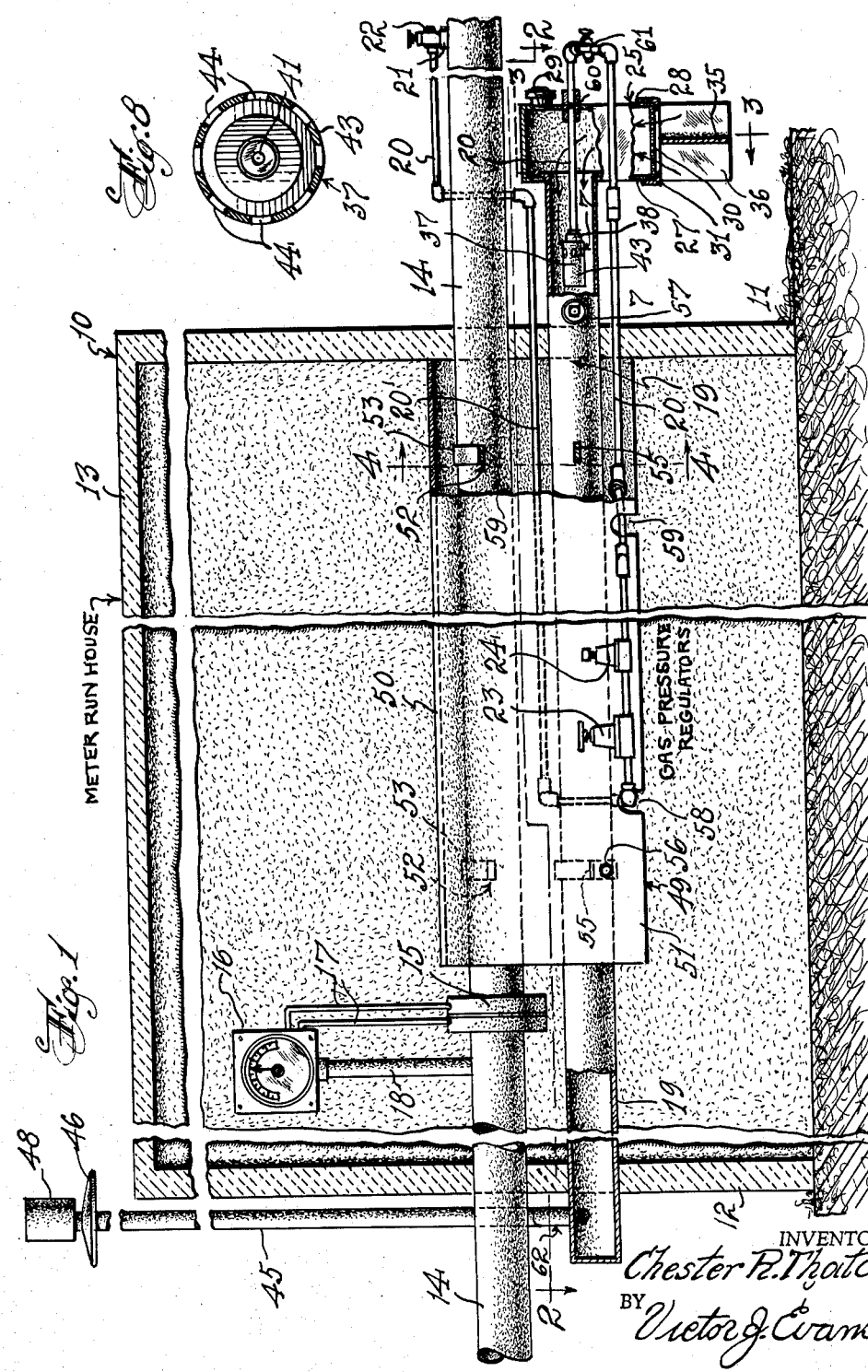

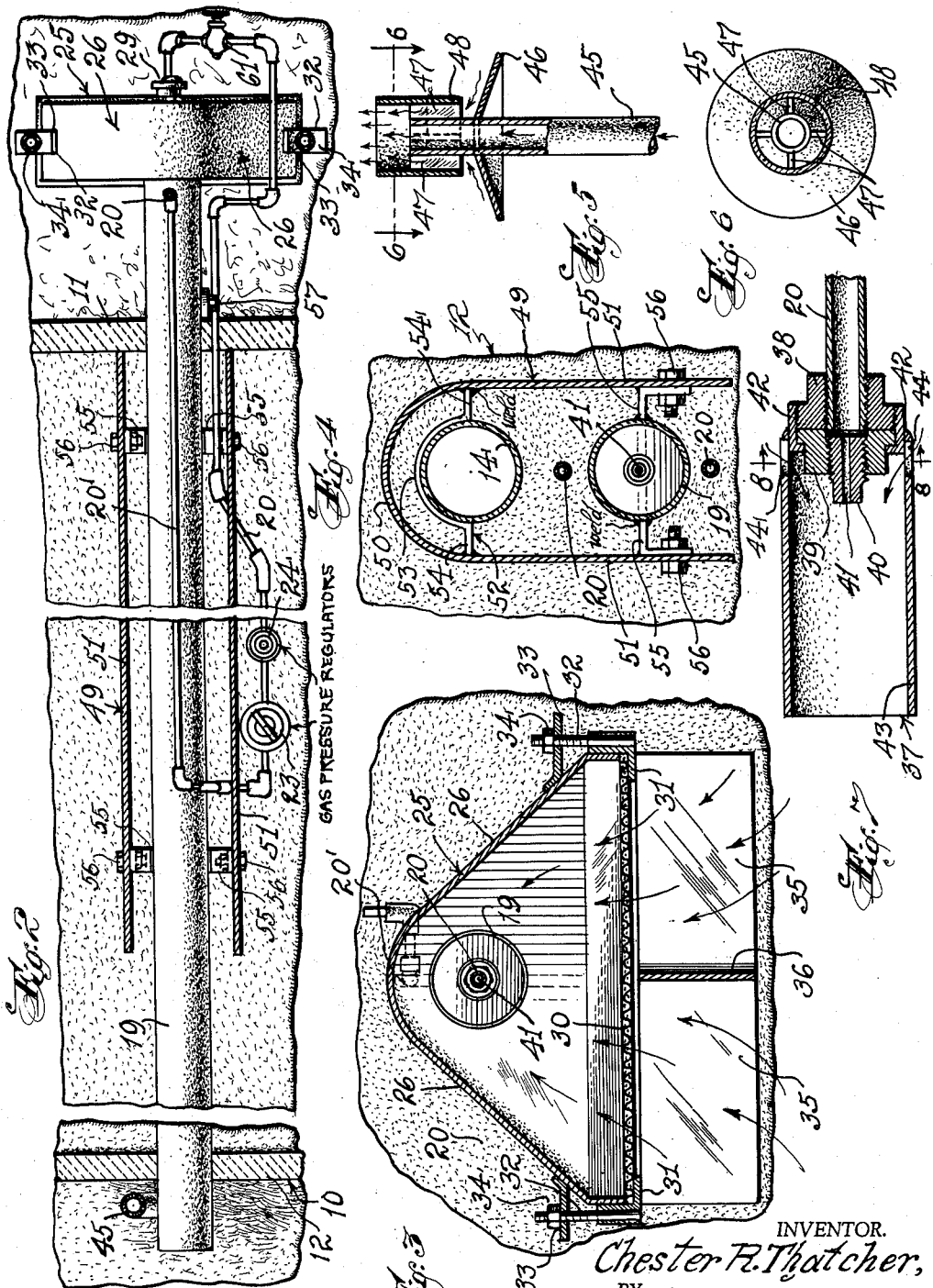

3,097,667
METER RUN HEATER
Chester R. Thatcher, 2913 E. 24th St.,
Farmington, N. Mex.
Filed Feb. 24, 1961, Ser. No. 91,375
4 Claims. (Cl. 138—32)

This invention relates to a heater, and more particularly to a heater for use with a natural gas line or run.

The primary object of this invention is to provide a heater that is adapted to be used in conjunction with equipment that is utilized in the production and metering of natural gas, and wherein heat is adapted to be provided for a natural gas meter run and against the meter run flanges so as to prevent freezing off and icing of the metering orifice.

Another object of the invention is to provide a meter run heater that includes a burner tube which is adapted to be arranged in a meter run house and wherein there is also provided a fire arrester housing which has associated with it a wind deflector, and wherein the meter run heater of the present invention will serve to effectively heat a meter run and metering orifice and flanges so as to prevent freezing off and icing of the metering orifice.

A still further object of the invention is to provide a meter run heater which includes a detachable stack and vent cap, and wherein there is also provided a fire arrester and fire arrester head with a burner and window, there being a wind deflector for preventing down drafts, the heater of the present invention serving to force and hold heat against the meter run and orifice flanges in a highly effective and efficient manner.

A still further object of the invention is to provide a meter run heater which has low original and maintenance cost, and wherein a minimum amount of fuel is used, and wherein the heater of the present invention is constructed so that it will burn in the wind better than heaters now available or presently in use.

Still another object is to provide such a meter run heater that is economical to manufacture and efficient in operation and which is rugged in structure and foolproof in use.

These and other objects of the invention will become apparent from a reading of the following specification and claims, together with the accompanying drawings, wherein like parts are referred to and indicated by like reference characters and wherein:

FIGURE 1 is a longitudinal sectional view taken through a meter run house, and illustrating the meter run heater of the present invention, and with parts broken away and in section.

FIGURE 2 is a sectional view taken on the line 2—2 of FIGURE 1.

FIGURE 3 is a sectional view taken on the line 3—3 of FIGURE 1.

FIGURE 4 is a sectional view taken on the line 4—4 of FIGURE 1.

FIGURE 5 is a fragmentary sectional view illustrating certain constructional details of the present invention.

FIGURE 6 is a sectional view taken on the line 6—6 of FIGURE 5.

FIGURE 7 is an enlarged sectional view illustrating the burner nozzle.

FIGURE 8 is a sectional view taken on the line 8—8 of FIGURE 7.

Referring in detail to the drawings, the numeral 10 indicates a meter run house which includes the usual vertically disposed end walls 11 and 12 as well as a top wall or top portion 13, FIGURE 1, and the numeral 14 indicates a pipe line which extends through the house 10, and the pipe line 14 defines a meter run for conveying gas such as natural gas from a well, and wherein this gas is adapted to flow from right to left in FIGURE 1. Orifice flanges 15 are mounted in the meter run 14 in the usual manner, and a meter 16 is connected as at 17 to the orifice flanges 15, there being a vertical member 18 extending between the meter run 14 and the meter 16.

The numeral 19 indicates a horizontally disposed burner tube which extends longitudinally through the house 10, and the burner tube 19 is positioned below the meter run 14. As shown in the drawings a conduit or pipe 20 of small diameter is connected as at 21 to the meter run 14, and a shut off valve 22 is provided for the pipe 20. The point of connection of the pipe 20 to the meter run 14 is outside of the house 10. As shown in FIGURE 1, a portion of this pipe which is indicated by the numeral 20′ is interposed between the meter run 14 and the burner tube 19 so that the gas flowing through the pipe portion 20′ can be preheated in order to insure that the present invention will function in the most advantageous manner. Gas pressure regulators 23 and 24 are connected in a portion of the pipe 20, FIGURES 1 and 2.

The numeral 25 indicates a housing which is arranged outside of the meter run house 10, and the housing 25 includes sloping upper wall portions 26 and inner and outer vertically disposed wall members 27 and 28, and the bottom of the housing 25 is open, as for example as shown in FIGURE 3. The numeral 29 indicates a viewing window which is mounted in the outer wall member 28 of the housing 25, and as shown in FIGURE 3 for example, a horizontally disposed fire arrester screen 30 is mounted in the lower portion of the housing 25. The screen 30 is retained in place in the bottom of the housing 25 by means of a frame 31, and the frame 31 is held in its proper location by means of securing elements or bolts 32 which extend through lugs 33, and the lugs 33 are secured as by welding to the wall portions 26 of the housing 25. Fasteners such as nuts 34 are arranged in threaded engagement with the upper ends of the bolts 32.

Depending from the frame 31 are wind deflectors 35 and 36, for a purpose to be later described.

The numeral 37 indicates a burner nozzle which is mounted in the burner tube 19, and the nozzle 37 is connected to an end of the pipe 20. The nozzle 37 embodies a body piece 38 which is mounted on an end of the pipe 20, and there is provided a support member 39 which is arranged contiguous to the body piece 38. A plug 40 is mounted in the support member 39, and the plug 40 is provided with a central opening or aperture 41 therein. The numeral 42 indicates a union or clamp which serves to connect the support member 39 and body piece 38 together, and a mixture tube 43 is secured as by welding to the union 42. The mixture tube 43 is provided with a plurality of spaced apart slots 44 therein whereby air can enter the tube 43 to support combustion.

As shown in the drawings, there is provided an upright vent pipe or stack 45 which has its lower end connected to the burner tube 19, and a cone shaped wind deflector 46 is suitably secured to the upper portion of the pipe 45, FIGURE 5. Spacers 47 are secured as by welding to the upper end of the vent pipe 45, and a cylindrical cap 48 surrounds the upper end of the pipe 45 and is secured to the spacers 47, FIGURE 6.

The numeral 49 indicates a cover or hood which includes an upper arcuate portion 50 as well as vertically disposed side portions 51, and the numeral 52 indicates a saddle which embodies an intermediate arcuate section 53 which extends over the meter run 14. The saddle 52 further includes horizontally disposed portions 54 that are secured as by welding to the inner side portions of the hood 49 so as to help maintain the hood in its proper position on the meter run 14 and burner tube 19. There is also provided brackets 55 which are secured as by welding to the burner tube 19, and the brackets 55 are connected as at 56 to the lower portions of the hood 49.

The numeral 57 indicates a removable plug which can be removed in order to permit lighting of the burner.

As shown in FIGURE 1 for example, portions of the hood 49 are cut away or recessed as at 58 and 59 so as to provide clearance for the extension therethrough of a portion of the pipe 20.

From the foregoing, it is apparent that there has been provided a meter run heater, and with the parts arranged as shown in the drawings, it will be seen that gas such as natural gas is adapted to flow from a well from right to left in FIGURE 1 and this gas flows in the usual manner through the meter run or pipe line 14. The meter run house 10 is arranged so that the member 14 extends therethrough as shown in the drawings, and the small diameter pipe 20 is tapped into the run 14 as at 21 whereby a small portion of the natural gas can flow from the run 14 into the pipe 20, and the valve 22 can be manually regulated in order to control the flow of gas through the pipe 20. This gas will flow through the portion or section 20' of the pipe 20, and as shown in the drawings the portion 20' is interposed between the run 14 and the burner tube 19 so that the gas flowing through the pipe portion 20' can be preheated before it is burned. This fuel or gas will then flow through the remaining portion of the pipe 20 and it is to be noted that the burner nozzle 37 is connected to that portion of the pipe which is arranged in an end of the burner tube 19. The plug 57 can be removed from the tube 19 whereby the fuel in the vicinity of the nozzle 37 can be ignited, and then the plug 57 can be replaced. A person can readily look through the viewing window or transparent member 29 so as to observe the conditions in the housing 25. The flame produced at the nozzle 37 as the result of the burning of the gas that is discharged through the orifice 41 will be contained in the burner tube 19 and the heat from the flame in the burner tube 19 will be guided or directed by the hood 49 into the vicinity of the orifice flanges 15 so that heating can take place in the vicinity of the flanges 15 whereby freezing up or icing up of these parts will be prevented. It is to be noted that one end of the hood 49 abuts or engages the inner surface of the wall 11 so that the heat cannot escape from this end of the hood 49, but the other end of the hood 49 is open whereby the heat can be discharged out through this open end and onto the orifice flanges 15 which are to be heated or warmed. Air for supporting combustion in the nozzle 37 is supplied through the slots 44 in the mixture tube 43, and the plug 40 is mounted in place in the support member 39. The support member 39 is adapted to be connected to the body piece 38 of the nozzle as for example by means of the union or clamp 42, and the mixture tube 43 is suitably secured as by welding to the member 42.

The housing 25 is provided with a generally closed top portion but is open at the bottom thereof, and the screen 30 is mounted in the bottom portion of the housing 25, the screen 30 functioning as a flame arrester. The members 35 and 36 function as wind deflectors for the housing. The exhaust gases from the burner tube 19 flow up through the vent pipe 45 and are discharged to the atmosphere. The hood 49 is held in place by means of the saddle 52 and by means of the previously described brackets 55, as for example as shown in FIGURE 4, and the hood 29 is positioned so that the heat from the burner tube 19 will be conveyed or directed in the direction of the orifice flanges 15, and wherein the portion of the pipe as indicated by the numeral 20' will also be preheated as previously stated.

The parts can be made of any suitable material and in different shapes or sizes.

It will therefore be seen that there has been provided a meter run heater which is adapted to be used in the production and metering of natural gas, and the heater of the present invention will serve to convey heat along a natural gas meter run such as the meter run 14 and against the meter run flanges 15 to prevent freezing off and icing of the meter orifice. The heater is placed within the meter house 10 with both the inlet end and outlet end protruding out through the meter house ends, as for example as shown in FIGURE 1.

The heater includes the burner tube or metal pipe 19 which acts as a fire box and this tube hangs below the meter run 14. The hood 49 which is adapted to be made of light sheet metal is placed around over the meter and down over the burner tube, and the hood has stand offs 52 with saddles to fit the contour of the meter run so as to provide a hot air space. The lower end of the hood 49 fastens to the short angle iron clips 55 that are welded horizontally to the burner tube 19 with a space between them to allow convection of hot air upward around the meter run.

As shown in the drawings a space is left between the hood and meter flanges 15 to permit hot air to convect upward and outward to dissipate the heat against the flanges 15. The opposite end of the hood 49 is flush against the meter housing as at 11 so as to keep hot air from escaping from that end.

The fire arrester housing 25 is placed on the inlet end of the burner tube 19 with the burner or nozzle 37 inside. The fire arrester 30 is made of fine screen mesh and is supported by the angle iron frame 31 that is attached to the air inlet to insure against flash backs and fire leakage to the outside of the heater. A coupling 60 is welded in the fire arrester housing to connect the fuel gas to the burner and to detach the burner from the inside.

The flue stack 45 is provided to vent the fumes above the meter house with the vent cap 48 to protect against wind disturbances.

The plug or cap 57 is removable for providing the means of lighting the burner, and a window of mica or the like as indicated by the numeral 29 is placed on the fire arrester housing to permit vision inside to aid in adjusting the flame. The small diameter pipe 20 is provided with the portion 20' that is arranged just above the burner tube 19 so as to act as a heat exchanger to preheat the incoming fuel gas to provide better combustion and also to avoid freeze ups in the regulators. The regulator system including the gas pressure regulators 23 and 24 is placed in the fuel line to regulate the required pressure for the burner, and a valve 61 is installed to provide a means for adjusting the flame.

The hood 49 can be disconnected or disassembled from the burner tube by means of the bolt 56 in order to facilitate installation. The stack disassembles to allow cleaning as at 62. The fire arrester unbolts to give access to the burner, that is by removing the nuts 34, the screen 30 can be removed so as to gain access to the nozzle 37.

The wind deflector including the elements 35 and 36 are provided on the air intake to deflect air up into the fire box from any direction and this serves to prevent the formation of vacuum as the wind blows by the air intake and cause a down draft which will smother the fire by carbon monoxide.

Some of the advantages of the present invention are as follows. A meter run heater constructed according to the present invention will serve to heat a meter run and metering orifice and flanges to prevent freezing off and icing of the metering orifice. The meter run heater of the present invention includes the burner and fire box under the meter run with a hood over and around the meter run and fire box together with an air space for convection of air from the fire box upward around the meter run and outward toward the meter flanges. There is also provided the detachable stack and vent cap, as well as the fire arrester and fire arrester head with the burner and window. The fuel line includes the heat exchanger portion and regulator system with a burner, and there is a capped aperture to light the burner, and there is also a wind deflector for preventing down drafts.

The heater of the present invention is advantageous since it will serve to force and hold the heat against the meter run and orifice flanges more effectively and efficiently than existing space heaters which just heat the meter house, and in addition the meter run heater of the present invention has a lower original cost as well as low maintenance cost, and wherein there will be less fuel used as compared to larger heaters which are used to heat all the incoming gas to the meter run. The heater is constructed so that it will burn in the wind better than conventional heaters now in use.

Minor changes in shape, size and rearrangement of details coming within the field of invention claimed may be resorted to in actual practice, if desired.

What is claimed is:

1. In a meter run heater, a house having a meter run extended therethrough, orifice flanges mounted in said meter run, a horizontally disposed burner tube extending through said house and positioned below said meter run, an elongate open-ended hood of inverted U-shape in cross-section positioned in said house with its arcuate bight portion including saddle elements seated at spaced points along said meter run and the leg portions thereof extending downward below said burner tube, one end of said hood being contiguous with an end wall of said house and the other end thereof terminating adjacent said orifice flanges for directing heated air currents to the latter, a housing arranged outside of the meter run house, said housing being connected to an end of said burner tube, and a small diameter pipe having one end connected to said meter run, and a portion of said pipe extending through the housing and into said burner tube, and a burner nozzle arranged in said burner tube and connected to said pipe.

2. The structure as defined in claim 1 wherein said housing is supported on said burner tube and is formed with an air inlet on its bottom, and a fire arrester is removably secured onto said inlet, whereby upon removal of said arrester said burner may be reached for servicing same.

3. The structure as defined in claim 1 wherein said pipe includes an inlet reach portion running parallel and above said burner tube on the order half the length thereof and returning, and connected to said burner.

4. In a device of the character described, a meter run house, a meter run extended through said house, orifice flanges connected to said meter run, a horizontally disposed burner positioned below said meter run and said burner tube extending through said house, a small diameter pipe having one end connected to said meter run and said pipe having a shut off valve therein, a portion of said pipe being interposed between said meter run and said burner tube, a housing arranged outside of the meter run house and said housing being connected to an end of the burner tube, a viewing window in said housing, a fire arrester in the lower portion of the housing, wind deflectors below said fire arrester, a burner nozzle mounted in said burner tube and said nozzle being connected to said pipe, a vertically disposed flue stack embodying a vent pipe connected to said burner tube, a generally cone shaped wind deflector connected to the upper portion of the flue stack, a cylindrical cap surrounding the upper end of said stack, and a hood positioned in said house and said hood including an arcuate upper portion and vertically disposed side portions, and means connecting said hood to said meter run and burner tube, one end of the hood being flush with a portion of the meter house whereby said one end of the hood is closed off, and the other end of the hood being open and being spaced a short distance from the orifice flanges.

References Cited in the file of this patent
UNITED STATES PATENTS

| | | |
|---|---|---|
| 1,194,325 | Zimmerman | Aug. 8, 1916 |
| 1,447,212 | Kerr | Mar. 6, 1923 |
| 1,794,868 | Schifferle | Mar. 3, 1931 |
| 2,531,139 | Lilly et al. | Nov. 21, 1950 |
| 2,581,075 | Buck | Jan. 1, 1952 |
| 2,707,095 | Parsons et al. | Apr. 26, 1955 |
| 2,720,201 | Lebus | Oct. 11, 1955 |
| 2,941,525 | Harshfield | June 21, 1960 |